United States Patent [19]

Morgan

[11] Patent Number: 5,321,259
[45] Date of Patent: Jun. 14, 1994

[54] IMAGING DEVICE WITH PRISM SCAN ELEMENT MEANS

[75] Inventor: Colin G. Morgan, Horspath, United Kingdom

[73] Assignee: Oxford Sensor Technology Limited, Oxford, United Kingdom

[21] Appl. No.: 910,308
[22] PCT Filed: Jan. 22, 1991
[86] PCT No.: PCT/GB91/00093
§ 371 Date: Jul. 21, 1992
§ 102(e) Date: Jul. 21, 1992
[87] PCT Pub. No.: WO91/11290
PCT Pub. Date: Aug. 8, 1991

[30] Foreign Application Priority Data

Jan. 23, 1990 [GB] United Kingdom ............... 9001509

[51] Int. Cl.$^5$ .................................................. H01J 3/14
[52] U.S. Cl. ........................................ 250/236; 359/211
[58] Field of Search ............... 250/234, 235, 236, 216; 359/211

[56] References Cited

U.S. PATENT DOCUMENTS

| | | | |
|---|---|---|---|
| 3,775,735 | 11/1973 | Funk et al. | 359/211 |
| 4,311,384 | 1/1982 | Keene | 359/211 |
| 4,355,904 | 10/1982 | Balasubramanian | 356/376 |
| 4,698,498 | 10/1987 | Mahoney et al. | 359/211 |
| 4,795,224 | 1/1989 | Goto | 250/236 |

FOREIGN PATENT DOCUMENTS

| | | |
|---|---|---|
| 3106369 | 2/1982 | Fed. Rep. of Germany . |
| 207347 | 2/1984 | Fed. Rep. of Germany . |
| 3626944 | 2/1988 | Fed. Rep. of Germany . |
| 275425 | 1/1990 | Fed. Rep. of Germany . |

Primary Examiner—David C. Nelms
Attorney, Agent, or Firm—Webb Ziesenheim Bruening Logsdon Orkin & Hanson

[57] ABSTRACT

The device comprises a structure (1) supporting a light beam source (2), a beam guide and a camera assembly (3), the light beam source (2) being arranged to direct an outgoing beam of light (I) into the beam guide which projects the outgoing beam (P) onto a target surface to sweep the beam around an endless path (E) on the target surface, scans synchronously around the endless path (E) to receive light returning from the portion of the path (E) illuminated by the outgoing beam (P), and directs the returning light (P) onto a light sensor (12) provided in the camera assembly (3); the beam guide comprising a rotatable wedge prism (5) arranged such that the outgoing beam (2) is transmitted through relatively inclined surfaces (9, 10) of a projecting element of the prism (5) as it is rotated to direct the beam (P) to sweep around the endless path (E) and the light returning from the portion of the path illuminated by the beam (P) is received through relatively inclined surfaces (9, 10) of a receiving element of the prism (5) as it is rotated to direct the returning light (P) onto the light sensor (12). The position of the image formed on the sensor (12) is indicative of the range of the illuminated portion of the target surface and, from a knowledge of the position of the scanning beam, its three-dimensional position can be determined. An image of the sensed topology can thus be built up as the target surface is scanned.

14 Claims, 7 Drawing Sheets

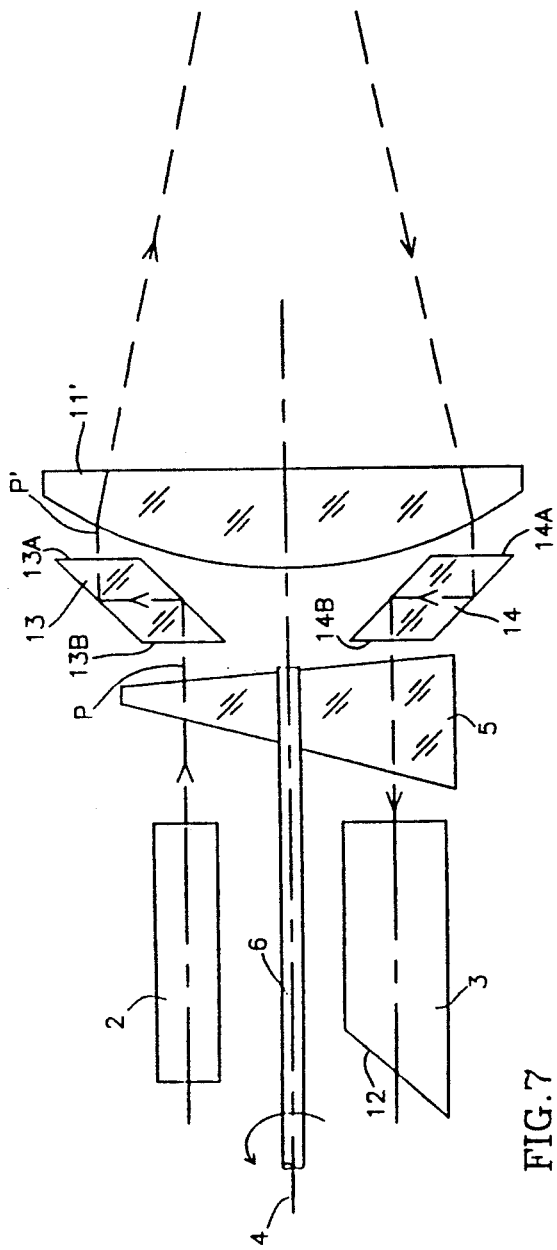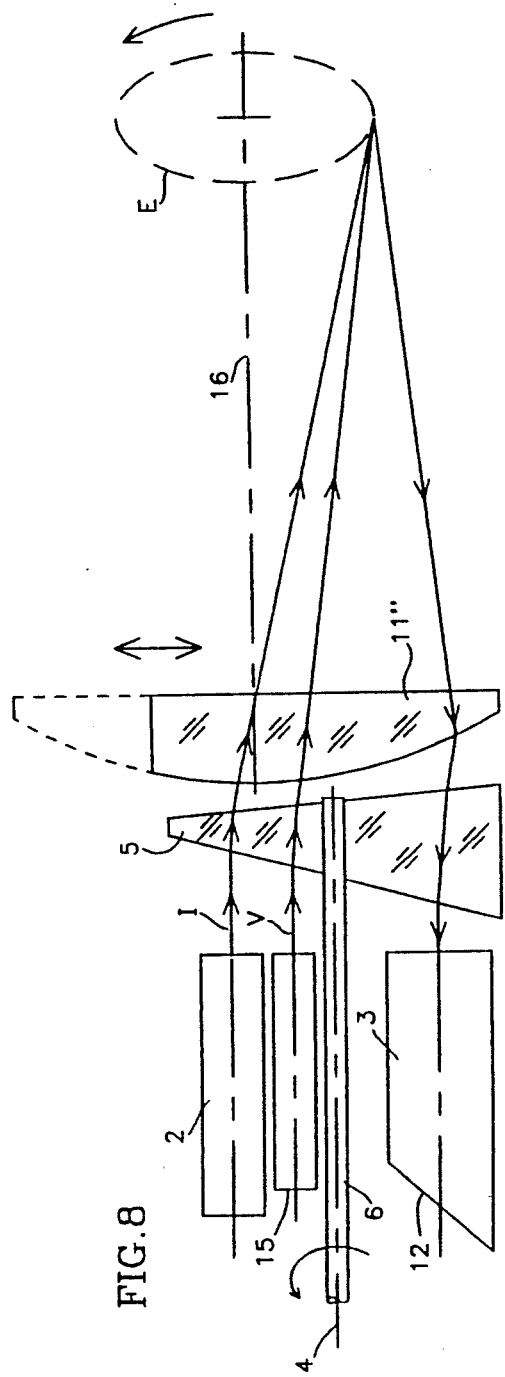
FIG. 7
FIG. 8

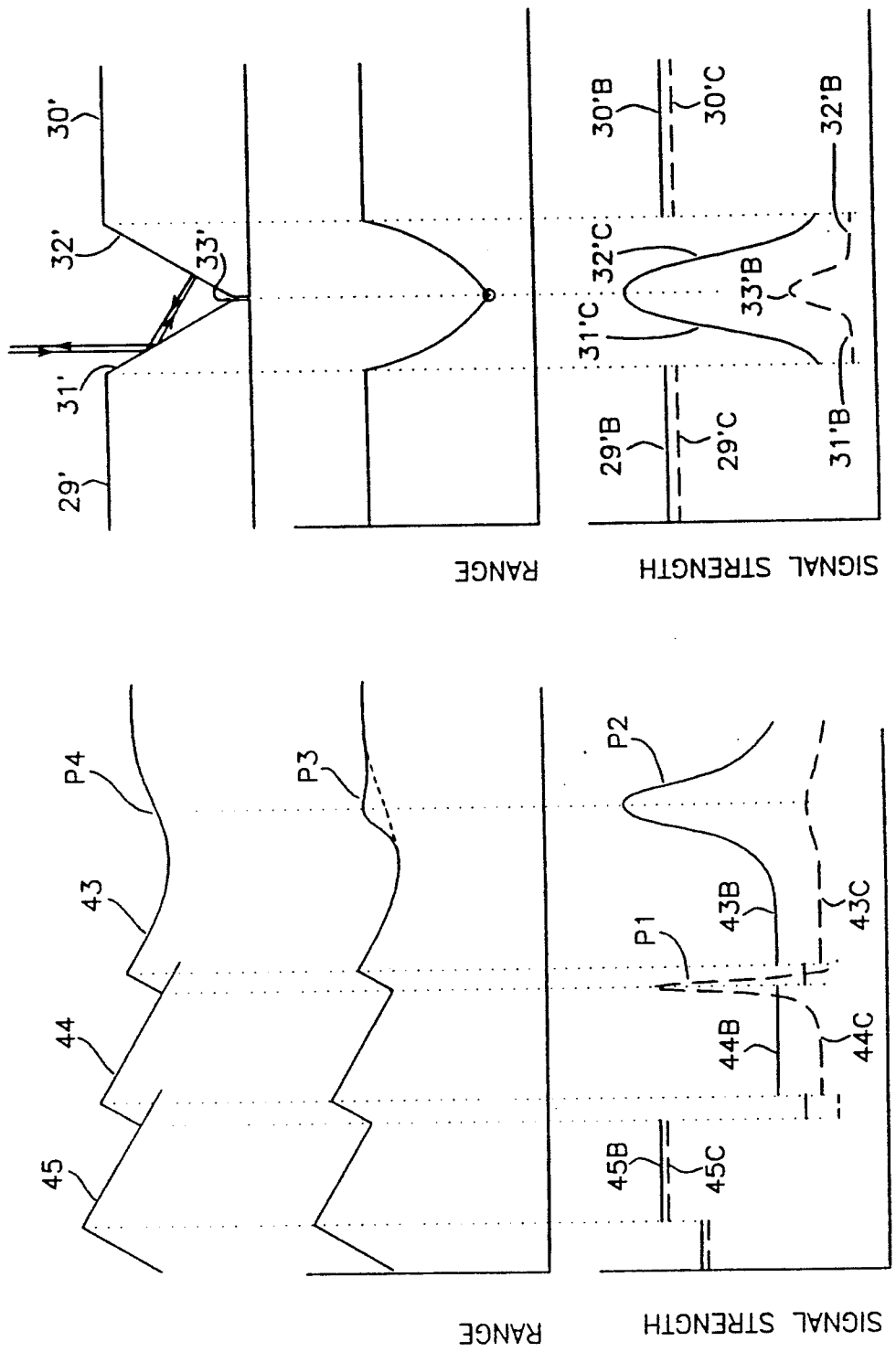

IMAGING DEVICE WITH PRISM SCAN ELEMENT MEANS

TECHNICAL FIELD

This invention relates to an imaging device suitable for use in guiding a robot arm, in particular an arm supporting a welding torch in automatic welding applications carried out by welding robots. The device may also be used to guide the operation of automatic cutting machines.

BACKGROUND ART

In order to guide a robot arm in a welding robot it is necessary to locate the seam to be welded relative to the welding electrode. It is desirable to obtain three dimensional (3D) information concerning the topology of the target surface in which the seam lies since this enables much more information to be obtained about the surface and attributes much greater versatility to the welding robot.

An imaging device capable of obtaining 3-D information about a target surface has been proposed by the Caterpillar Tractor Co., in the U.S. Pat. No. 4,501,950. In this document, the disclosed imaging device comprises a support structure supporting a laser beam source, arranged to direct an incident laser beam into a beam guide whereby the laser beam is directed to traverse a circular path on the target surface. The beam guide is also provided with a window which rotates synchronously with the incident laser beam in order to view an image of the target surface illuminated by the laser beam. The window forms part of a receiving portion of the beam guide which includes an assembly of mirrors or prisms arranged to reflect the image into a chamber which extends along the axis of rotation of the beam guide, and to direct the image through the chamber. A dove prism is mounted in the chamber and supported by a sub-assembly of the beam guide to rotate at half the speed, but in the same direction, as the projecting portion of the beam guide. Thus, as the image passes through the dove prism it is "de-rotated" with respect to the support structure. Upon leaving the dove prism the image is directed into a camera assembly fixedly mounted above an aperture in the chamber.

The camera assembly of this device includes a focusing lens arrangement which directs the "de-rotated" image onto a one-dimensional sensor array. The sensor array is sensitive to the linear position at which the laser beam strikes it, and transduces this information into electrical signals which are transmitted to a data processor. The information is processed in conjunction with the angular orientation of the light guide which corresponds to the position of the laser beam on the circular path. The information concerning the angular orientation is obtained from a substantially conventional transducer.

It will be appreciated that it is highly desirable that an imaging device located on the end of a robot arm should be as light and compact as possible. However, it is also necessary to accommodate the conflicting requirement of being robust, so that the imaging device can endure the very hostile conditions experienced during a welding operation. The quality of the optics, particularly the light guide, dramatically affects the performance of the imaging device as a result of losses and distortion in transmission.

Some of these problems can be alleviated by omitting the optical "de-rotation" of the image, and using a two dimensional light sensor in the camera assembly instead and devising a suitable program for "de-rotating" the image by computer, as suggested in the aforementioned U.S. patent. However, the difficulties of processing the information obtained, and the loss of immunity to multiple reflection problems in particular, is often such as to outweigh the advantages of this tactic.

The complexity of imaging devices constructed in accordance with U.S. Pat. No. 4,501,950, results in them being large, heavy, difficult to set up, expensive and lacking in robustness. Hence the versatility of the prior art imaging devices is severely limited.

It is an objective of the present invention to provide an imaging device suitable for mounting on the arm of a welding robot, close to the welding torch, in order to obtain 3-D topological data from a target surface, which alleviates the aforementioned disadvantages of the prior art.

DISCLOSURE OF INVENTION

According to the present invention there is provided an imaging device comprising a support structure supporting a light beam source a beam guide and a camera assembly, the light beam source being arranged to direct an outgoing beam of light into the beam guide, the beam guide being adapted to project the outgoing beam onto a target surface to sweep the beam around an endless path on the target surface, to scan synchronously around the endless path to receive light returning from the portion of the path illuminated by the outgoing beam, and to direct the returning light onto a light sensor provided in the camera assembly; characterised in that the beam guide comprises rotatable prism means arranged such that the outgoing beam is transmitted through relatively inclined surfaces of a projecting element of the prism means as it is rotated so as to direct the beam to sweep around the endless path and the light returning from the portion of the path illuminated by the beam is received through relatively inclined surfaces of a receiving element of the prism means as it is rotated so as to direct the returning light onto the light sensor, the respective inclined surfaces of the transmitting element and receiving element being parallel with each other.

According to another aspect of the invention there is provided an imaging device comprising a support structure supporting a light beam source, a beam guide and a camera assembly, the light beam source being arranged to direct an outgoing beam of light into the beam guide, the beam guide being adapted to project the outgoing beam onto a target surface to sweep the beam around an endless path on the target surface, to scan synchronously around the endless path to receive light returning from the portion of the path illuminated by the outgoing beam, and to direct the returning light onto a light sensor provided in the camera assembly; characterised in that the beam guide comprises rotatable optical means which is optically equivalent to rotatable prism means combined with lens means such that the outgoing beam is transmitted through a projecting portion of the optical means as it is rotated so as to direct the beam to sweep around the endless paths and to focus the beam onto the target surface and the light returning from the portion of the path illuminated by the beam is receiving through a receiving portion of the optical means as it is rotated to collimate the returning light and to direct it onto the light sensor.

Preferred and optional features of the invention will be apparent from the following description and the subsidiary claims of the specification.

BRIEF DESCRIPTION OF DRAWINGS

Embodiments of an imaging device constructed in accordance with the present invention will now be described by way of example only, with reference to the accompanying drawings, in which:

FIG. 7 is a sectional view of optical components of a second embodiment of the invention using periscopic prisms to enhance the resolution of the imaging device;

FIG. 8 is a sectional view of optical components of a third embodiment of the invention using an assymetric convex standoff lens to displace the centre of the endless path;

FIG. 12 shows a complex lap joint supported in a jig and graphs illustrating the range information measured and the intensity of images received as an imaging device using the sub-assemblies shown in FIG. 11 scans the joint; and FIG. 13 shows a sixty degree Y-joint and graphs illustrating the range information measured and the intensity of images received using circularly polarised light and the sub-assemblies shown in FIG. 11.

BEST MODE OF CARRYING OUT THE INVENTION

Figure 1:
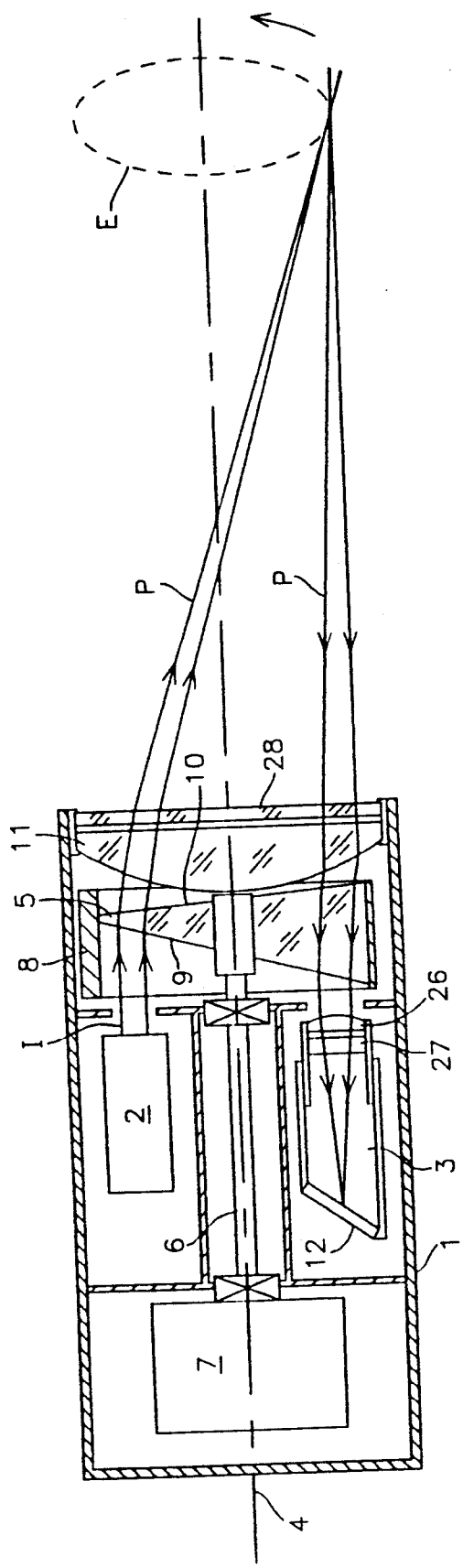
FIG. 1 is a sectional view of a first embodiment of the imaging device.
Figure 3:
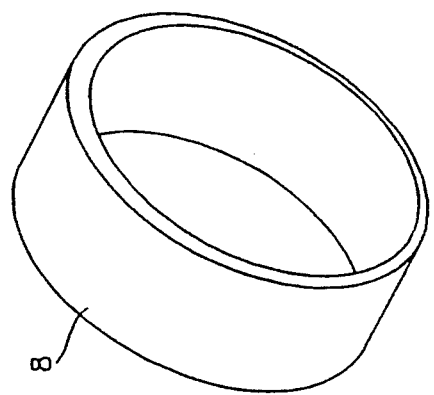
FIG. 3 is a perspective view of a counter-balance for the prism means shown in FIG. 2.
Figure 2:
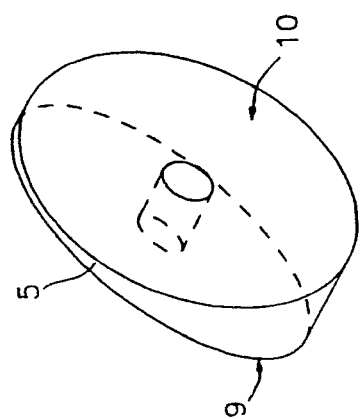
FIG. 2 is a perspective view of prism means used in the first embodiment.

Referring to FIGS. 1 to 3, the first embodiment of the imaging device comprises, a support structure provided by a cylindrical housing 1; a light beam source, provided by a laser 2; an optical guide (described further below) and a camera assembly 3. The laser 2 is preferably a laser diode with a collimator. The inherently better signal to noise ratio (S/N) of a scanner, together with the optical efficiency of the arrangement described, means that only a low power laser diode 2, e.g. 5 mW, should be required. The camera assembly 3 is provided with an appropriate lens system, e.g. comprising a camera lens 26 and an interference filter 27 and arranged to receive light returning parallel to the axis 4.

The collimator of the laser 2 is fixedly mounted, radially spaced from a central longitudinal axis 4 of the housing 1 and disposed to project an incident beam of light I parallel to the axis 4 into the beam guide.

The beam guide is mounted in a front end of the housing 1 and comprises a wedge prism 5 provided with a cylindrical periphery and an axially extending hole whereby the prism 5 is mounted for rotation about the axis 4 on an axially extending drive shaft 6. The drive shaft 6 extends towards a rear end of the housing 1 where it is coupled to a drive motor 7. An assymetric counter balance ring 8 made from a heavy metal such as brass (to minimize its size) extends around the periphery of the prism 5 in order to balance the prism 5, and allow the assembly to rotate smoothly during use. Perspective views of the prism 5 and counter-balance ring 8 are shown in FIGS. 2 and 3 respectively.

Figure 4:
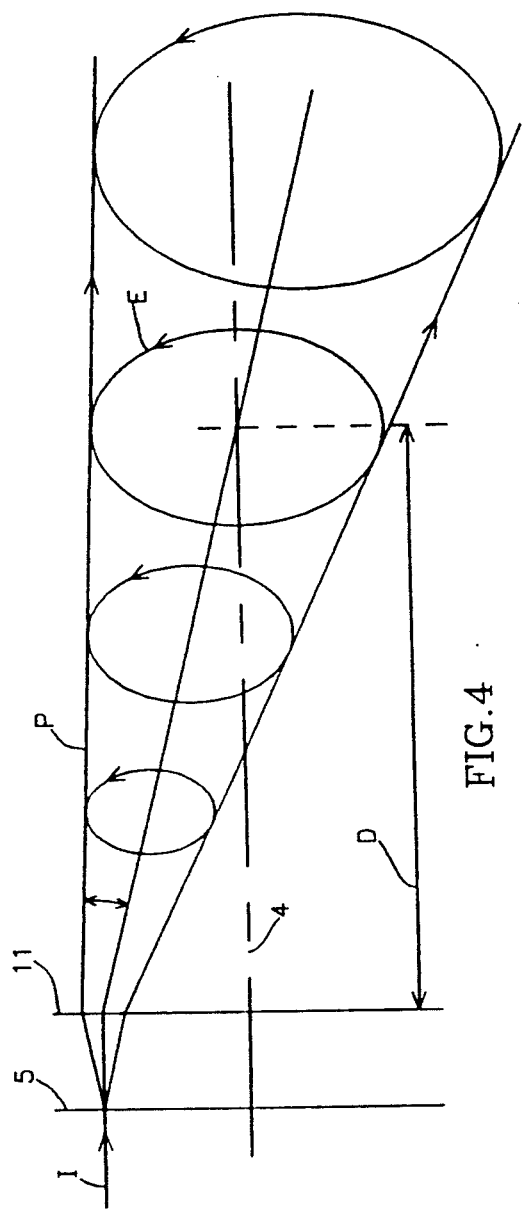
FIG. 4 is a diagrammatic representation of the path followed by a beam projected from the first embodiment.

The prism 5 is arranged so that the laser beam I impinging on it will always be transmitted through its inclined surfaces 9 and 10 and hence, the beam I passing through the prism will be deflected from a path parallel to the axis 4. It will readily be appreciated that the magnitude of the deflection angle of the beam will be constant and will depend upon the prism angle and the attitude of the prism 5 with respect to the axis 4. However, the direction of the beam deflection will depend upon the angular orientation of the prism 5 (about the axis 4), which controls the angular orientation of an element of the prism through which the beam I is passing at any instant. Hence, by rotating the prism 5, the angular orientation changes cyclically over each revolution thereof and causes a beam P projected from the rotating prism 5 to sweep endlessly around a conical surface as can most readily be seen in FIG. 4. When the beam P is incident on a target surface, it will progressively illuminate portions of an endless path E, as it sweeps around. The prism 5 may, typically, be rotated at between 10 and 50 revolutions/second to cause the beam P to sweep around the endless path at the same rate.

Also included in the beam guide is a fixedly mounted standoff lens 11, arranged to focus the parallel rays of the beam P on to the target surface at a nominal range D. The standoff lens 11 has a symmetrical axis and is disposed with this axis coincident with the axis 4 of the housing 1.

The beam P impinging on the target surface will be reflected and/or scattered according to the nature of the surface, (i.e. whether it is a specular, mirror-like, reflecting surface or, a Lambertian surface). This reflected or scattered light carries the image of the surface illuminated by the beam and subsequent descriptions of manipulation of the image by the imaging device will be understood to refer to manipulations of this light.

In order to view the image it is necessary to scan the portion of the target surface instantaneously illuminated by the beam. This is achieved by mounting the camera assembly 3 to receive light through a further element of the prism 5 located diametrically opposite the element through which the beam I was projected. Thus, as the beam P progresses around the endless path E, the camera assembly 3 receives images through the standoff lens 11 and this further element of the prism 5. In the process of being transmitted through the surfaces 10 and 9 of this element, the effect of the element through which the beam I was projected is reversed and the image is de-scanned. Thus, the image does not proceed around an endless, two dimensional (for practical purposes) path and can be treated as an almost dimensionless spot which will be displaced linearly, along the length of a one dimensional (1-D), or linear, light sensor 12, in accordance with the distance between the imaging device and the target surface.

For ease of description, the element of the prism 5 through which the beam I is projected will be referred to as the transmitting element and the element of the prism 5 through which the returning beam P is receiving will be referred to as the receiving element.

It will be appreciated that the beam guide thus employs a simple rotating prism both to scan and de-scan a beam by virtue of its refractive properties, whereas prior art imaging devices, such as that described above, depend upon much more complex arrangements of prisms and/or mirrors to achieve this effect. A beam guide constructed in this manner is also much less complex, and may be made more compact than prior art beam guides. Furthermore, the beam guide can easily be made with a high optical performance (i.e. minimal distortion and light loss) at substantially less cost than the beam guides used in comparable prior art imaging devices.

The light sensor 12 is a conventional opto-electronic device which generates electrical signals indicative of the position at which the image falls on its surface. These signals are transmitted to a data processing device (not shown) which also receives data indicative of the instantaneous angular orientation of the prism 5. It will be appreciated that the instantaneous angular orientation of the prism 5 is indicative of the position of the projected beam in its progress around the path E. Thus, the distance (along the axis 4) of the target surface from the imaging device, and the location of the part of the surface illuminated by the beam, in two spatial dimensions, lying in a plane perpendicular to the axis 4 are determined and hence determine the location of the image in three dimensions with respect to the imaging device. This information may be integrated for a number of image samples sufficient to allow the topography of the surface to be determined.

A number of devices may be used to determine the angular orientation of the prism 5 and these include the use of a shaft encoder/resolver (not shown) or alternatively the signals from the linear sensor 12 can be sampled in response to a trigger actuated by the rotation of the prism 5.

Figure 5:
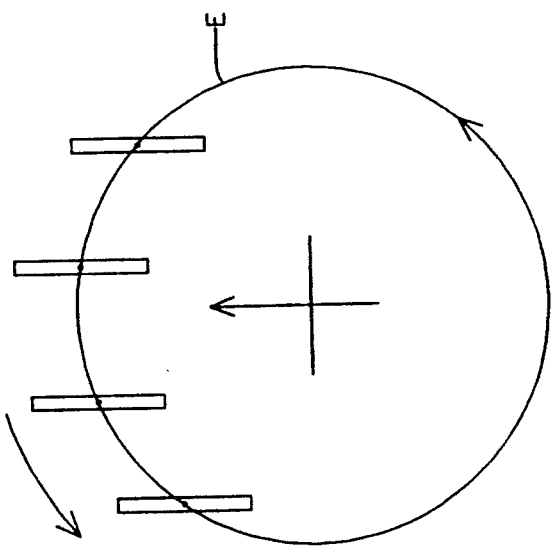
FIG. 5 is a diagram indicating the field of view of the first embodiment.

FIG. 5 illustrates the field of view of the light sensor as the imaging device scans around the path E. (assuming it is maintained stationary with respect to the target surface). It should be noted that the field of view of the sensor does not rotate but is displaced around a circular path whilst maintaining the same orientation. This is in contrast to the prior art described above in which the field of view rotates about a central axis.

As will be noted from FIG. 1, the linear sensor 12 is inclined with respect to the axis 4 in order to give greater depth of field. The angle is chosen to satisfy the well known Scheimpflug condition so that all points along the line of sight of the laser beam P can be brought into focus on the sensor 12. The imaging device is arranged so that the central ray of the light beam is focussed at infinity and the centre of the sensor 12 intercepts the focal point of the lens 11.

With an ideal arrangement, the laser spot would trace out an exactly circular path on the target and the corresponding image position on the linear sensor would indicate the range of the target and this would be independent of the prism scan angle, i.e. when looking at a flat surface perpendicular to the sensor axis 4, a constant signal level should be sensed as the prism rotates. As the distance of the target changes, there would be a corresponding change in the signal level. In practice, this situation is not strictly satisfied for the imaging device described but with suitable optical design these and other aberrations can be kept to a minimum.

Figure 6:
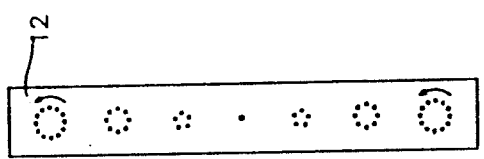
FIG. 6 is a plan view of a light sensor used in the camera assembly of the first embodiment.

FIG. 6 indicates how the image spot position varies throughout the rotation of the prism for various target distances. Note the spot position moves around in both the x and y directions (although the extent of this movement is exaggerated in the Figure, particularly the deviation across the width of the sensor). In practice, the magnitude of this deviation can be reduced to the point where it is comparable with the size of the image spot itself. Also, the magnitude of this deviation can be made very small at the centre of the detector which corresponds to the nominal target distance which is where greatest accuracy is required (and may be chosen to correspond with the typical position of a weld joint during seam tracking). Due to this, the calibration procedure that converts the sensor signal into range must also take account of prism orientation.

Two other factors are important in minimising these variations:

1) the prism 5 should be oriented so as to minimise the refraction angle of the beam passing through each of its surfaces, i.e. by making the inclined faces of the prism symmetrical with the beam entering one face and the beam leaving the other face (so the refraction angle through each face is the same). This means that one face of the prism will be more inclined to the axis 4 than the other (as shown in the Figures).

2) The use of an aspheric standoff lens 11 is also preferred to a spherical lens in order to minimise aberrations.

It will be appreciated that, while the embodiment described above is simple and compact, a variety of alternative configurations may be used. For instance, the prism 5 may be mounted in bearings which engage the interior of the housing 1 and may be formed as the rotor of a drive motor with the stator extending around the drive shaft 6.

The standoff lens may be a single convex lens as described above, or preferably an aspheric to reduce abberations. The lens may be symmetric, with its symmetric axis coincident with the axis of the imaging device. When the standoff lens 11 is symmetric, the lens 11 and wedge prism 5 can be combined as a single optical element. Such a combined optical element is effectively a lens mounted to rotate about an axis offset from its own optical axis and the radius of the endless path E at the nominal range will equal this offset distance. The terms 'prism' and 'prism means' used in this specification are therefore to be understood to include an optical element such as that described above which, as it is rotated, refracts a beam passing through it so as to direct it to sweep around an endless path.

In another arrangement (not shown), the prism 5 may comprise a pair of wedge prisms mounted back to back so that the effective prism angle can be changed by relative rotation of the back to back prisms. This provides a way of changing the scan angle, i.e. the angle between the projected beam and the axis 4, without the need to replace the prism with another having a different prism angle. Once, the prism angle had been set by relative rotation of the two prisms, they would be secured together and rotated as one unit about the axis 4 in the same manner as the wedge prism 5 shown in the drawings.

The resolution of the imaging device is improved by increasing the distance between the projecting element and the receiving element thereby increasing the triangulation angle. This can be achieved by the provision of a prism 5 with a larger radius and corresponding location of the laser 2 and camera assembly 3 further from the axis 4. However, this approach to enhancing the resolution has mechanical disadvantages because of the increased size and weight of the prism 5. The problem of weight may be alleviated by the use of annular prism. However, the second embodiment of the imaging device, illustrated in FIG. 7, provides a preferred solution to this problem by the use of a projecting periscopic prism 13 and a receiving periscopic prism 14.

The projecting periscopic prism 13 is fixedly mounted between the projecting element and the standoff lens 11', while the receiving periscopic prism 14 is fixedly mounted between the standoff lens 11 and the receiving element. Apart from their location, the periscopic prisms 13 and 14 are identical and comprise parallel-pipeds each having a first pair of opposite surfaces disposed substantially perpendicular to the axis 4, and a second pair of opposite surfaces inclined to the axis 4; so that the distance between the surfaces 13A and 14A perpendicular to the axis, and remote from the prism 5, is greater than the distance between the surfaces 13B and 14B perpendicular to the axis and close to the prism 5. The inclination of the inclined surfaces of the projecting periscopic prism 13 is arranged to deflect the beam P, radially away from the axis 4, before deflecting the projected beam P' back onto a course substantially parallel to that of beam P. The effect of the receiving periscopic prism 14 on the image is exactly opposite. This has the effect of increasing the distance between the projecting and receiving elements without incurring the penalty of an increased rotating mass. The width of the housing 1 and prism 5 may also be reduced. Furthermore, the periscopic prisms 13 and 14, and the necessarily enlarged standoff lens 11' can be provided as a simple optional module which can conveniently be substituted for the standoff lens 11 described for the first embodiment.

It is sometimes necessary to use a laser which emits a beam with a frequency not visible to the human eye. This creates difficulties in locating the imaging device so that the target surface is at the nominal focus of the standoff lens. To overcome this problem, the third embodiment illustrated in FIG. 8, incorporates a second laser beam source 15 mounted to project a visible laser beam V parallel to the main laser beam I. In addition to allowing convenient focusing of the imaging device, the visible laser provides a warning as to the presence of the more powerful and potentially hazardous main laser.

FIG. 8 also illustrates the use of an assymetric standoff lens 11" which has its optical axis 16 offset from the axis 4 of the imaging device. This has the effect of displacing the centre of the path E which remains centred about the axis 16 of the lens 11". This can be used, for example, to alter the region of the target surface being scanned by the device, e.g. to alter the lead distance between the sensor and the welding tool.

Figure 9B:
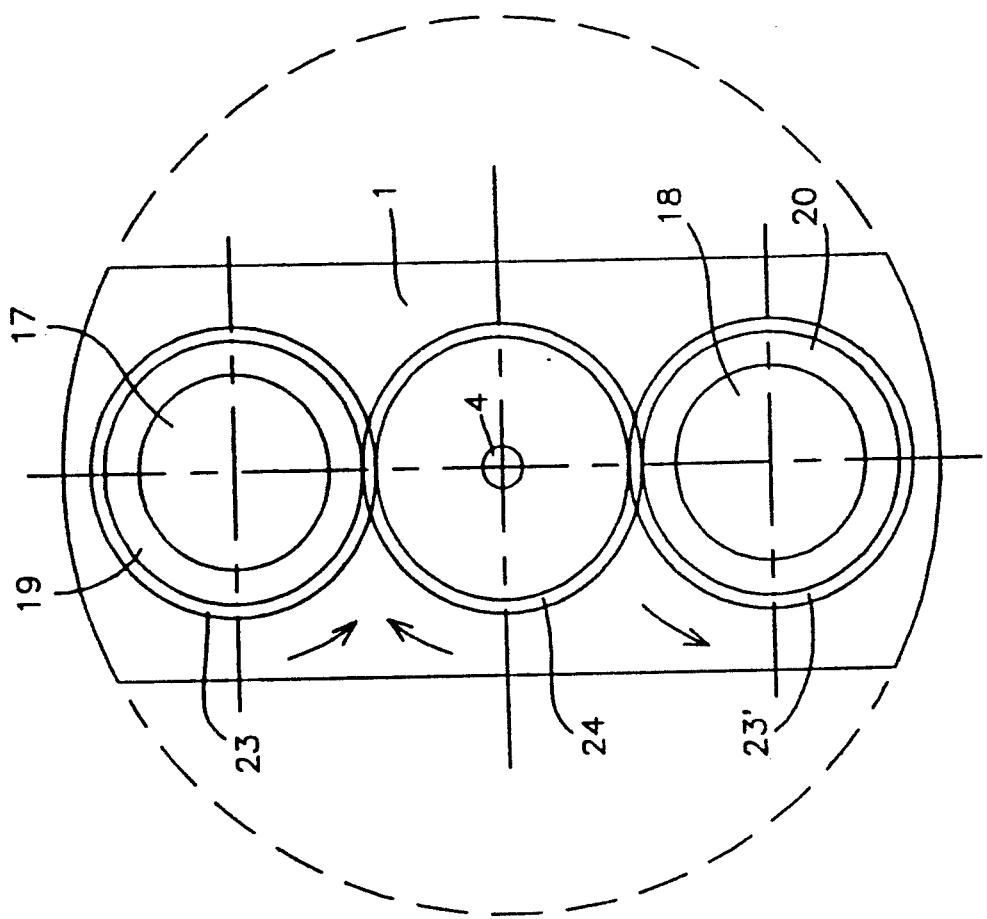
FIGS. 9A and 9B show sectional and plan views, respectively, of optical components of a fourth embodiment of the imaging device in which the projecting and receiving elements are provided by separate wedge prisms.
Figure 9A:
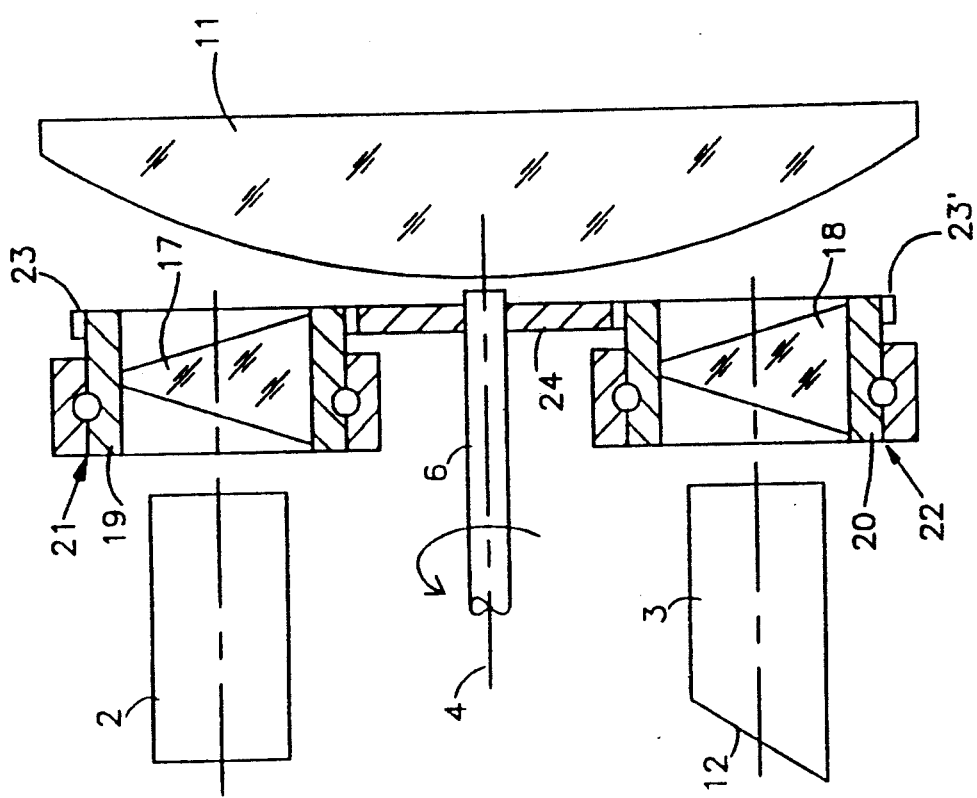

The fourth embodiment shown in FIGS. 9A and 9B illustrates a way of reducing the width of the imaging device by substituting the single prism 5 with two identical wedge prisms 17 and 18. Each of these prisms has a cylindrical periphery and is provided with a counterbalance ring, 19 and 20 respectively, to balance the structure and enable it to rotate smoothly. The peripheral surface of each counterbalance ring 19, 20 is adapted to provide one of the races of ball bearings 21, 22 whereby each prism is rotatably mounted in the housing 1'. Externally toothed annular gears 23 and 23' are provided on the rings 19 and 20 and are engaged with a central gear 24 mounted for rotation on the drive shaft 6 so that rotation of the drive shaft 6 drives each of the prisms 17 and 18 at exactly the same speed and in the same direction. The axis of rotation of the prism 17 is diametrically opposite the axis of rotation of the prism 18 with respect to the axis 4; and the prisms 17 and 18 are mounted so that each inclined surface of the prism 17 is parallel to the corresponding surface of the prism 18. Thus, when the laser source 2 is arranged to project the laser beam P through the prism 17, and the camera assembly 3 is arranged to receive images through the prism 18, the prism 17 provides the projecting element and the prism 18 the receiving element. It will be realised that it is not essential to locate the axes of the prisms 17 and 18 diametrically opposite one another with respect to the axis 4.

The standoff lens 11 preferably has a periphery shaped to conform to the front end 25 of the housing of this embodiment (as shown in FIG. 9B) to minimise its weight. A similarly shaped standoff lens may also be used with the embodiment illustrated in FIG. 7 to reduce the weight of the device.

In all the embodiments, the beam guide components may be protected by a sacrificial transparent window 28 mounted in the front of the housing 1 as shown in FIG. 1. The mounting is adapted to enable easy replacement of the window 28. An air supply (not shown) may also be provided to pass cooling air over the window 28.

Although the previously described embodiments of the present imaging device are capable of producing reliable data to determine the topology of many target surfaces, there are a number of circumstances, caused by certain topologies and surface characteristics, which commonly produce misleading data. The apparatus described below may be installed in the previously described embodiments in order to provide means to cope with, or at least identify, incidences of such circumstances.

In order to understand the nature of these imaging problems, it is first necessary to consider (a much simplified) description of the basic physics underlying the process of scattering of light from a surface. Two fundamental processes are involved:

1) Lambertian Scattering

In this case, photons from the laser beam are scattered in random directions. Such scattering generally results in good quality images that are easy to interpret. Matt surfaces such as unglazed paper, cloth, skin and dull metal give reasonable approximations to Lambertian scattering.

2) Specular Reflection

In this case, photons are reflected from the surface in a very specific direction. A mirror is a near perfect specular reflector. Many of the surfaces encountered in the welding process are specular in nature. The highly directional nature of specular reflections create problems for vision sensors. The strength of the signal (i.e. the intensity of the image) returned to the detector can vary by orders of magnitude within a scan. The brighter the metal surface the worse the problem. In general the surface roughness is such that a small amount of scattering also occurs which can, with care, be detected.

A number of the problems encountered with welding sensors are caused by strong specular reflections arising due to the nature of the weld joint and the choice of beam angle. FIG. 10 shows a common weld joint situation viewed along the direction of travel of the welding torch, which lies along the plane of the laser and camera. The joint known as a V-prep consists of two metal plates 29 and 30 (which are to be welded together) butted together with prepared (machined) chamfered edges 31 and 32 to form an enclosed 90 degree V-section valley 33. As the laser beam scans across the surface of the joint, so the field of view of the detector follows. The surfaces of the metal plates 29 and 30 are typically dull (with oxidation, dirt or rust) and give good quality Lambertian signals. The prepared chamfered surfaces 31 and 32, however, are specular and give a poor return signal. The enclosed 90 degree valley 33 acts as a corner reflector giving a very strong double reflection back towards the sensor.

Figure 10A:
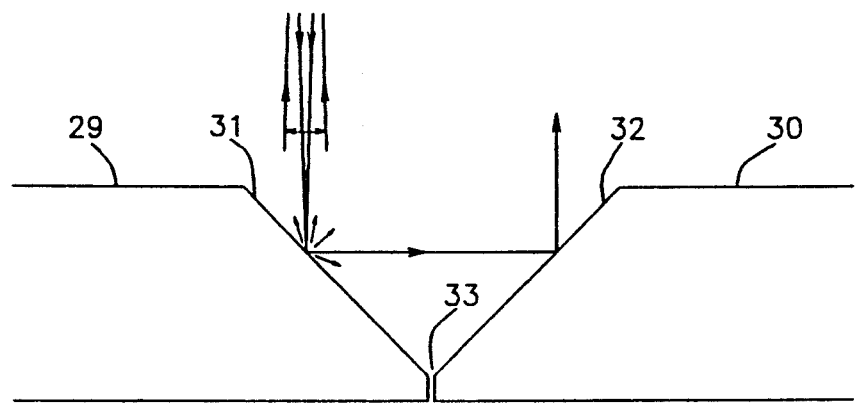
FIGS. 10A to 10D illustrate the path of a projected beam over a ninety degree V-section weld seam, the range information measured and graphs of the intensity of the image received using unpolarised light and circularly polarised light.
Figure 10B:
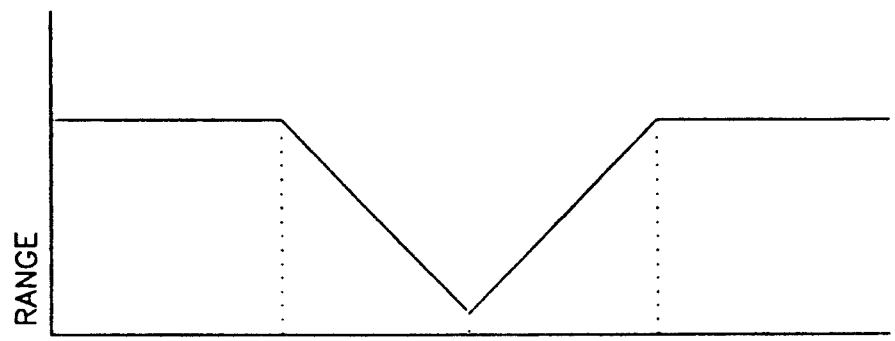
Figure 10C:
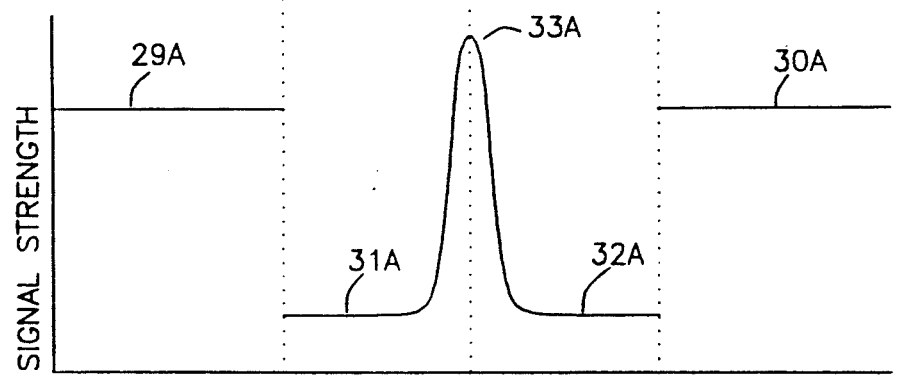

FIG. 10B shows how the range information measured by the scanner varies as it scans across the weld joint shown in FIG. 10A. Also shown in FIG. 10C is how the signal strength returned to the sensor varies. The signals 29A and 30A returned from the flat metal plates 29 and 30 are strong, but as the scan crosses the chamfered edges 31 and 32, the strength of the signal 31A and 32A is dramatically reduced. This reduction in signal strength can be several orders of magnitude making it difficult to detect the signal. As the scan crosses the centre of the joint, a dramatic increase in signal strength 33A occurs as the returned double reflection (corner reflection) falls within the narrow field of view of the detector. To deal with this problem, a control and analysis system (not shown) is provided to control both the intensity of the laser 2, and the gain of the signal from the sensor 12, to give optimal signal quality. The signal strength information should therefore preferably be monitored as well as the 1-D positional data. The way in which this is done depends upon the nature of the light sensor 12. If a linear position sensitive detector (PSD) is used (which is the preferred choice) then signal strength information is available automatically.

If a linear charged couple device (CCD) detector is used then it may prove more convenient to monitor the signal strength by means of a separate photo detector (not shown). The camera assembly 3 may, for example, be arranged so that light received by the sensor 12 is also reflected onto the photo-detector.

The strength of the return signal generated by the photo detector or the PSD (divided by the strength or intensity of the projected beam) is supplied to a control and analysis system (not shown) for analysis together with the positional data. As can be seen in FIG. 10B, this strength data shows features which can be used to great effect in the interpretation of the image. In general, image features (such as edges, corners, holes etc.) are associated with a discontinuity in signal strength.

Additional information about the nature of the weld joint can be obtained by making use of the polarisation properties of the light. With Lambertian scattering, the state of polarisation of the beam is lost as the photons are scattered with random direction and polarisation. However, with specular reflection, information about the polarisation state of the beam is preserved. It is convenient in this case to use circularly polarised light.

Upon undergoing specular reflection, the sense of circularly polarised light is reversed (i.e. right-handed circularly polarised light becomes left-handed and vice versa). This fact can be used to identify specular reflection situations and eliminate or at least identify a number of the problems that arise.

Figure 10D:
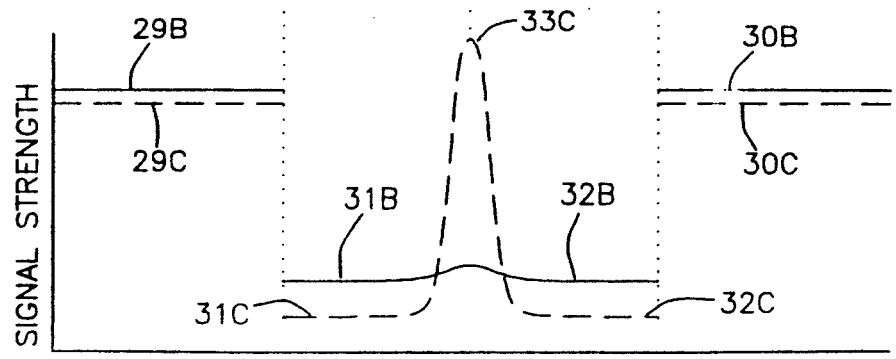

FIG. 10D shows the signal strength plot for a scan across the 90 degree V-groove weld joint where the right and left handed polarisation components of the beam are separated. The Lambertian scattering from the flat metal plates 29 and 30 results as before in strong signals 29B, 29C and 30B, 30C the left and right handed components (indicated by the broken and continuous lines, respectively) are of equal strength as Lambertian scattering results in a random polarisation state (equivalent to 50% each of left and right handed beams). The signals 31B, 31C and 32B, 32C from the chamfered surfaces 31 and 32 are both weak but the right-handed signal 31B and 32B is greater than the left-handed signal 31C and 32C (as a reversal in sense has occurred). The central peak 33C corresponding to the corner or double reflection is now only present on the left handed component, having undergone two reversals in sense to return with the same sense as the beam originally emitted.

Figure 11A:
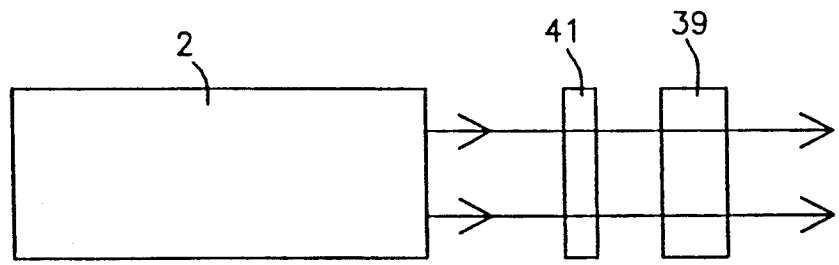
FIGS. 11A to 11C show sub-assemblies of optical devices which can be included in the imaging device to illuminate and view the target surface in polarised light.

FIG. 11A shows a projecting sub-assembly which circularly polarises the laser beam projected from the imaging device. The sub-assembly comprises a polarisation filter 41, mounted in the path of the beam from the collimator of the laser 2, which linearly polarises the beam. It should here be noted that the linear polarisation filter 41 may not be necessary since many laser beam sources, such as laser diodes, generate a linearly polarised beam. The assembly also comprises a quarter wave plate 39 mounted in the path of the linearly polarised beam. The quarter wave plate 39 converts the linearly polarised beam to a circularly polarised beam. The sense of polarisation (i.e. left or right handed) is controlled by the orientation of the wave plate 39 as is well known. For the sake of this example, a beam polarised in the LEFT handed sense will be considered.

Figure 11B:
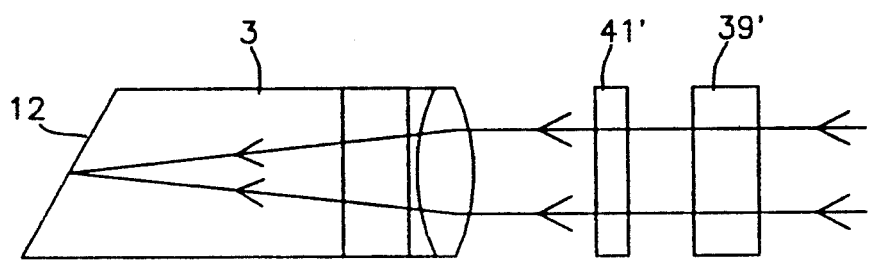

FIG. 11B shows a receiving sub-assembly (used in conjunction with the projecting sub-assembly shown in FIG. 11A) comprising a linear polarising filter 41' and quarter wave plate 39' (similar to the filter 41 and quarter wave plate 39 of the projecting sub-assembly) installed in the return path of the image to the camera assembly. With a suitable choice of filter orientations, this combination will only allow circularly polarised light of a particular state to pass through. By choosing to accept only the opposite state to the outgoing laser beam, the signal resulting from corner reflection situations can be to a large extent be eliminated.

FIG. 12 shows a more complex welding example from the automobile industry involving a lap joint between two thin steel pressings 43 and 44. In this case, the steel sheet 43 and 44 itself is bright and specular so gives relatively low signals 43B, 43C and 44B, 44C. A retaining jig 45 used to hold the sheets has a profile similar to that of the required weld joint between sheets 43 and 44 but being much used and dirty is more Lambertian in character and thus gives a much stronger signal 45B, 45C. The lap joint feature is complicated by the corner reflection resulting in a peak in the signal strength P1. The curved surface of the upper sheet 43 may also result in a specular angle situation as the laser passes close to position P4 (this is due to a small amount of light emitted by the laser diverging from the main beam and being strongly reflected at it own specular angle). This results in the large increase in signal strength P2 and distorts the positional information measured at P3. Unlike the corner reflection situation described with reference to FIG. 10, or present here at P1, the specular reflection at P4 results from a single scattering, and the peak in signal strength P2 occurs in the right-handed component (rather than the left-handed components as before). As the requirements for dealing with these two types of specular peak are different, it is therefore desirable to have access to both the left and right handed components of the returned signal.

Figure 11C:
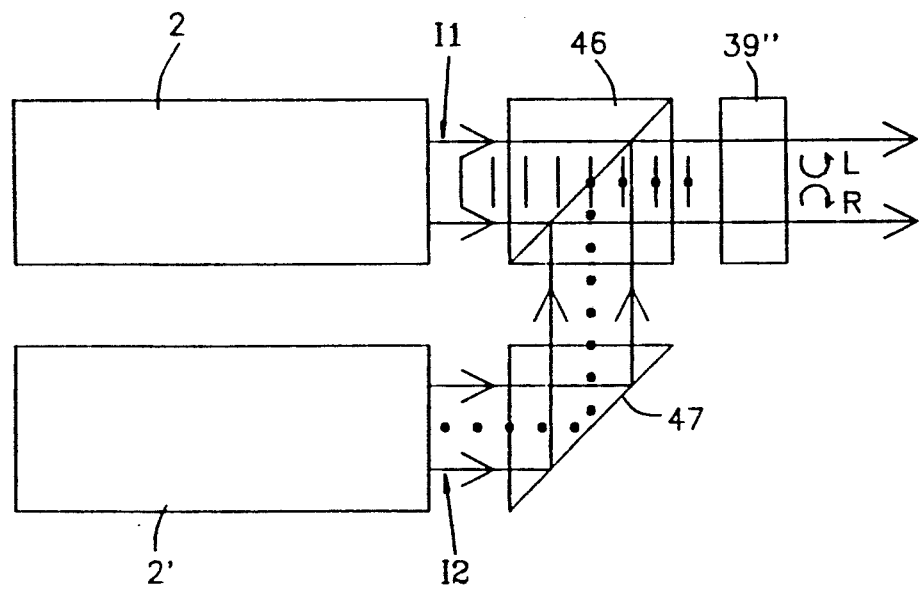

A projecting sub-assembly for achieving this is shown in FIG. 11C. Here the projected beam can be generated from the collimators of two (rather than one) lasers 2, 2'. The beams are combined by means of a polarising beam splitting cube 46 and prism 47. The two lasers 2, 2' are aligned to produce horizontal I1 and vertically I2 polarised beams as shown in FIG. 11C. The combined output beam after passing through a quarter wave plate 39" can now generate either left or right handed circularly polarised beams depending upon which of the two lasers 2, 2' is in use. When used in conjunction with the receiving sub-assembly shown in FIG. 11B, the signal strength of both components of the beam can then be measured.

In practice, alternative samples can be taken with each of the lasers being used, or complete scans can be taken with each of the lasers used in turn. By comparing strengths of the two components, a number of facts about the nature of the surface being observed can be deduced, for instance:

1) if the two components are of similar strength then the surface is probably Lambertian in nature.

2) if the signal strength of the right hand polarised light is stronger than the signal strength of the left handed signal, the surface is specular.

3) if the left handed signal is stronger than the right handed signal, then the surface is specular and in a corner reflection situation.

4) if the right handed signal is very strong then the beam is close to a specular angle. The positional data under this situation will therefore be unreliable.

A further problem is illustrated by the weld joint shown in FIG. 13. This is also a V-prep but here the included angle is 60 degrees. This joint has the property that when the chamfered edges 31' and 32' are scanned the beam undergoes a total of three reflections to return along the original plane of the incoming beam. In this situation, the return beam always falls within the field of view of the detector resulting in a strong signal for the right hand polarised beam over this area of the joint. The positional (range) information returned in this situation will therefore be unreliable except close to the root 33' of the joint itself where the first and third order reflection paths coincide. Such situations are difficult to interpret but something of the shape of the joint profile can be inferred from the position of the root 33' of the joint and the corners between the flat plates 29', 30' and the chamfered edges 32', 32'.

Additional information about specular surfaces can be obtained by using two (or more) cameras mounted separately in the housing but each having a detector arranged to receive light returning from the beam spot on the target surface and aligned with the beam from the laser so as to receive a de-scanned image. The main purpose in using two cameras is to cope with situations where the image is close to the specular angle when viewing shiny surfaces. If the data from one camera is bad then the other should produce good data; because, being located in a different position, it is unlikely to be close to a specular angle as well.

As indicated above, each detector should be aligned with the beam from the laser so the beam axis and the longitudinal axis of the detector are co-planar.

While the imaging device has been described with particular reference to its use in the guidance of a welding robot; it should be appreciated that the compatibility of the imaging device with the very demanding performance parameters required for this duty also makes it an imaging device suitable for many other applications.

The use of a laser as the light beam source is preferred because of its monochromatic nature. This readily allows interfering light from, for example, a welding arc, to be filtered from the light received by the imaging device, so that the surface is in effect always viewed in the light from the laser. The use of a laser diode and attached collimator is preferred because of its small size.

The imaging device preferably contains only those electronic components necessary to ensure the quality of the laser drive and the output of the linear sensor. The remainder of the electronics can be housed elsewhere on the apparatus where space is not at such a premium. The use of a prism both to scan the outgoing laser beam around a closed path and to de-scan the sensed image, greatly simplifies the construction of the imaging device compared to the prior art and by optimising the optical system used, the aberration inherent in the design can be kept to a minimum.

The simple and compact nature of the beam guide used in the imaging device described above, combined with the use of a compact light source 2, such as a laser diode, and compact camera assembly 3, enables the device to be made smaller and lighter than prior art devices and, in many cases, to be considerably less expensive to manufacture. The simple nature of the optical system used in the device also allows a variety of additional devices or components to be incorporated therein to enable further information to be extracted from the sensed image.

I claim:

1. An imaging device for sensing the range of a target surface, comprising:
   a) a support structure supporting a light beam source;
   b) a beam guide including prism means mounted for rotation about an axis;
   c) said prism means including a projecting element radially spaced from said axis and having at least two surfaces inclined relative to each other and a receiving element radially spaced from said axis having at least two surfaces inclined relative to each other, the corresponding surfaces of said projecting element and said receiving element being parallel to each other;
   d) a camera assembly having a linear light detector, said light beam source arranged to direct an outgoing beam of light into said beam guide, the beam guide adapted to project the outgoing beam around an endless circular path on a target surface to scan synchronously around the endless circular path, to receive light returning from a portion of the path illuminated by the outgoing beam, and to direct the returning light onto said linear light detector such that the position of an image formed on said linear light detector varies in accordance with the distance between the imaging device and the target surface; and e) said beam guide arranged such that the outgoing beam is transmitted through said radially spaced projecting element as said prism means is rotated about said axis so as to direct the beam to sweep around the endless circular path and such that light returning from the portion of the path illuminated by the beam is received through said radially spaced receiving element as said prism means is rotated about said axis so as to direct the returning light onto said linear light detector such that a measurement of a range of each part of the object scanned by the endless circular path can be determined and an image of the topography of the target surface is determinable from such measurements.

2. The imaging device of claim 1 wherein the beam guide includes lens means to focus the outgoing beam of light directed by the projecting element of the prism means onto the target surface and to collimate the returning light received by the receiving element of the prism means.

3. The imaging device of claim 2 wherein the prism means includes a rotatable wedge prism arranged such that the outgoing beam of light is transmitted through a projecting element provided by a first part of the prism radially spaced from its axis of rotation, and the returning light is received by a receiving element provided by a second part of the prism radially spaced from its axis of rotation, said first part and said second part being diametrically opposed from one another.

4. The imaging device of claim 1 wherein the prism means include two similar rotating wedge prisms providing the projecting element and the other the receiving element, the two prisms being arranged to rotate at the same speed and with the same angular orientation to ensure the respective inclined surfaces thereof remain parallel with each other.

5. The imaging device of claim 1 wherein the wedge prism has a cylindrical periphery and an asymmetric counterbalance ring is provided therearound to enable the prism to rotate smoothly about its axis of rotation.

6. The imaging device of claim 1 in which the light beam source, prism means and light detector are orientated so as to minimize the refraction angles of the outgoing beam and the returning light as they pass through each of the surfaces of said prism means.

7. The imaging device of claim 1 wherein the beam guide includes periscopic prisms through which the outgoing beam and the returning light are arranged to pass so as to effectively increase the radial spacing between the outgoing beam and said axis of rotation and between the incoming beam and said axis of rotation.

8. The imaging device of claim 2 wherein the lens means includes a symmetrical convex lens.

9. The imaging device of claim 8 wherein the convex lens is moveable so as to offset its axis of symmetry with respect to the axis of rotation of said prism means such that the position of the endless path on the target surface is adjustable.

10. The imaging device of claim 1 wherein said light detector includes a plurality of sensors arranged to receive light returning at different angles from the portion of the endless path illuminated by the outgoing beam.

11. The imaging device of claim 1 wherein the light detector further includes means for sensing the intensity of the returning light.

12. The imaging device of claim 11 wherein said light beam source is arranged to provide at least one beam of circularly polarized light and the light detector is arranged to sense the intensity of the left and/or right handed circularly polarized light received thereby.

13. The imaging device of claim 1 wherein said camera assembly is radially spaced and positioned remote from said axis of rotation.

14. An imaging device for sensing the range of a target surface, comprising:

a) a support structure supporting a light beam source;

b) a beam guide including rotatable optical means mounted for rotation about an axis;

c) a camera assembly having a linear light detector;

d) said light beam source arranged to direct an outgoing beam of light into the beam guide, the beam guide adapted to project the outgoing beam onto a target surface to sweep the beam around an endless circular path on the target surface to scan synchronously around the endless circular path to receive light returning from the portion of the path illuminated by the outgoing beam, and to direct the returning light onto said linear light detector such that the position of the image formed on the linear detector varies in accordance with the distance between the imaging device and the target surface; and e) said beam guide arranged such that the outgoing beam is projected through a projecting portion of the optical means radially spaced from said axis as it is rotated about said axis so as to direct the beam to sweep around the endless circular path and to focus the beam onto the target surface and arranged such that the light returning from the portion of the path illuminated by the beam is received through a receiving portion of the optical means radially spaced from said axis as it is rotated about said axis and to collimate the returning light and direct it onto the light detector, such that a measurement of the range of each part of the object scanned by the endless circular path can be determined and an image of the topography of the target surface is determinable from such measurements.

* * * * *

UNITED STATES PATENT AND TRADEMARK OFFICE
CERTIFICATE OF CORRECTION

PATENT NO. : 5,321,259
DATED : June 14, 1994
INVENTOR(S) : Colin G. Morgan

It is certified that error appears in the above-indentified patent and that said Letters Patent is hereby corrected as shown below:

Column 2 Line 26 "source a" should read --source, a--.

Column 3 Line 51 "Y-joint" should read --V-joint--.

Column 5 Line 51 after "E" delete ".".

Column 7 Line 15 before "annular" insert --an--.

Column 10 Line 55 after "extent" delete "be".

Column 11 Line 3 "it" should read --its--.

Column 12 Line 33 "aberration" should read --aberrations--.

Col. 13, line 35, after "prisms" insert
--arranged to rotate around parallel axes, one of the prisms--.

Signed and Sealed this

Sixth Day of September, 1994

BRUCE LEHMAN

*Attest:*

*Attesting Officer*     *Commissioner of Patents and Trademarks*